(12) United States Patent
Moon

(10) Patent No.: US 11,368,740 B1
(45) Date of Patent: Jun. 21, 2022

(54) TV CONTROL SYSTEM AND TV CONTROL DEVICE SUITABLE THEREFOR

(71) Applicant: Byung Chul Moon, Chungcheongbuk-do (KR)

(72) Inventor: Byung Chul Moon, Chungcheongbuk-do (KR)

( * ) Notice: Subject to any disclaimer, the term of this patent is extended or adjusted under 35 U.S.C. 154(b) by 0 days.

(21) Appl. No.: 17/439,799

(22) PCT Filed: Mar. 30, 2020

(86) PCT No.: PCT/KR2020/004333
§ 371 (c)(1),
(2) Date: Sep. 15, 2021

(87) PCT Pub. No.: WO2020/204531
PCT Pub. Date: Oct. 8, 2020

(30) Foreign Application Priority Data

Mar. 29, 2019 (KR) .................. 10-2019-0037164

(51) Int. Cl.
*H04N 21/422* (2011.01)
*H04N 21/442* (2011.01)
(Continued)

(52) U.S. Cl.
CPC ........... *H04N 21/4222* (2013.01); *H04N 5/58* (2013.01); *H04N 21/41265* (2020.08);
(Continued)

(58) Field of Classification Search
CPC combination set(s) only.
See application file for complete search history.

(56) References Cited

U.S. PATENT DOCUMENTS

| RE47,457 E * | 6/2019 | Fateh | ........................ G06F 1/16 |
| 2012/0313891 A1* | 12/2012 | Chang | .................. H03K 17/962 |
| | | | 345/174 |

(Continued)

FOREIGN PATENT DOCUMENTS

| KR | 10-1993-0003727 A | 2/1993 |
| KR | 10-1998-0007599 A | 3/1998 |

(Continued)

OTHER PUBLICATIONS

International Search Report for PCT/KR2020/004333 dated Jul. 13, 2020 from Korean Intellectual Property Office.

*Primary Examiner* — Samira Monshi
(74) *Attorney, Agent, or Firm* — Revolution IP, PLLC

(57) ABSTRACT

A TV control system includes: a TV control device which generates a viewing distance detection value and an illumination level detection value, inputs a setting value transmitted from the smart phone, and transmits a human body distance detection value, the illumination level detection value, the setting value, and a control signal to the smart TV; the smart TV which receives the viewing distance detection value, the illumination level detection value, and the setting value transmitted from the TV control device, and changes a distance and time setting value in response to the control signal; the smart phone which generates a control signal for changing distance information and a control signal for changing time setting and transmits the control signals to the TV control device; and a router which is connected to the smart phone and the TV control device through a communication network.

18 Claims, 13 Drawing Sheets

(51) Int. Cl.
*H04N 21/485* (2011.01)
*H04N 21/41* (2011.01)
*H04N 5/58* (2006.01)

(52) U.S. Cl.
CPC . *H04N 21/42203* (2013.01); *H04N 21/42221* (2013.01); *H04N 21/44218* (2013.01); *H04N 21/4854* (2013.01)

(56) References Cited

U.S. PATENT DOCUMENTS

| | | | |
|---|---|---|---|
| 2014/0179282 A1* | 6/2014 | Cao | H04L 51/046 |
| | | | 455/414.1 |
| 2015/0301670 A1* | 10/2015 | Chiu | G09G 3/2003 |
| | | | 345/589 |
| 2018/0149748 A1* | 5/2018 | Yang | G06V 40/166 |
| 2018/0221683 A1* | 8/2018 | Kang | F21V 3/00 |
| 2018/0330154 A1* | 11/2018 | Park | H04N 5/225 |
| 2020/0225742 A1* | 7/2020 | Krishnakumar | G02B 27/0093 |
| 2020/0387005 A1* | 12/2020 | Kakeya | H04N 13/366 |

FOREIGN PATENT DOCUMENTS

| | | |
|---|---|---|
| KR | 10-2011-0137849 A | 12/2011 |
| KR | 10-2012-0128373 A | 12/2012 |
| KR | 10-1948480 B1 | 2/2019 |
| KR | 10-2039857 B1 | 11/2019 |

\* cited by examiner

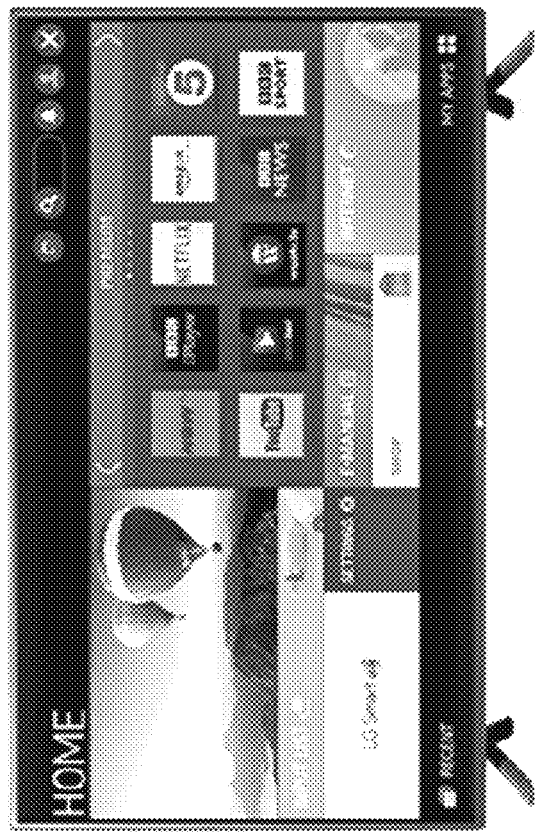
[FIG. 1]

[FIG. 2]
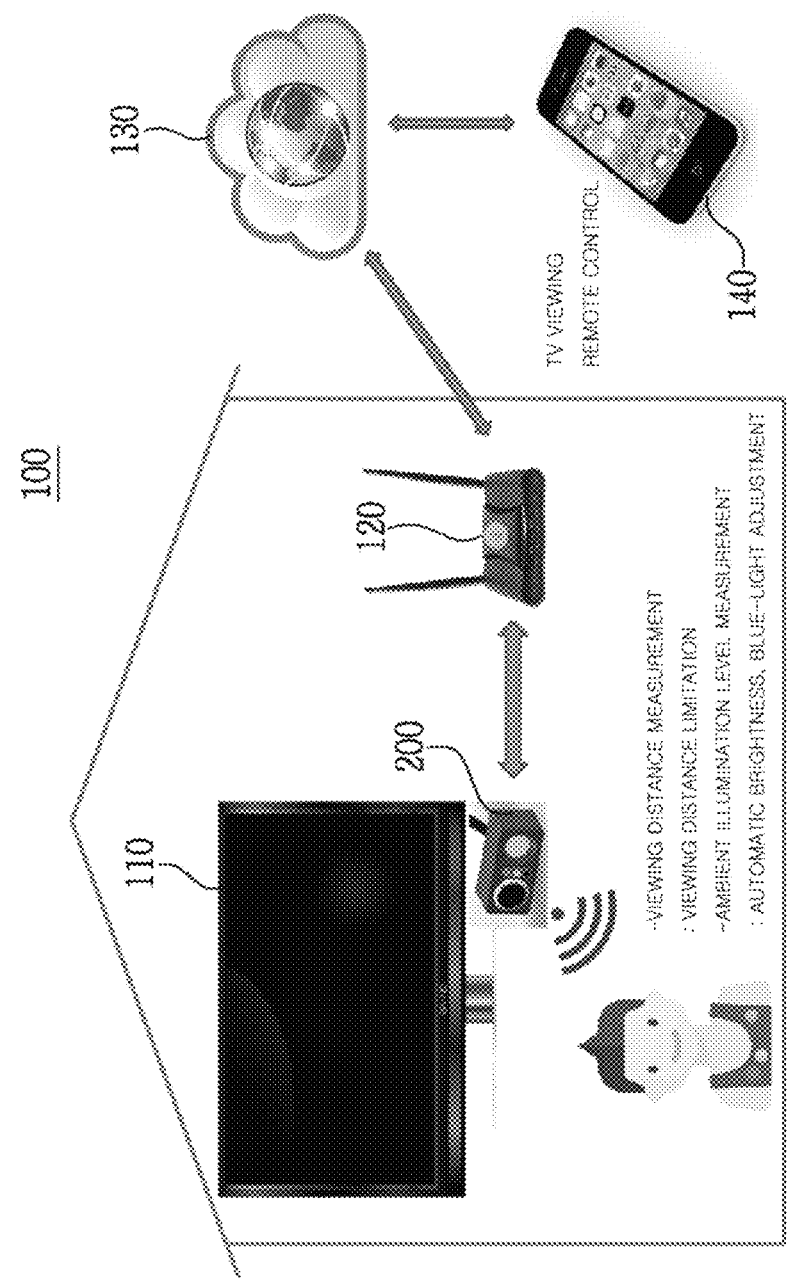

[FIG. 3]
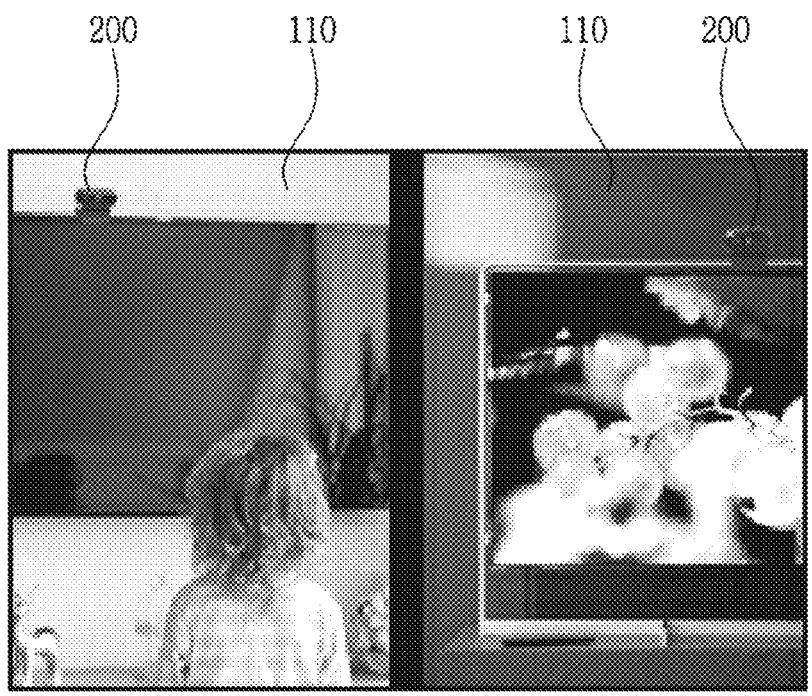

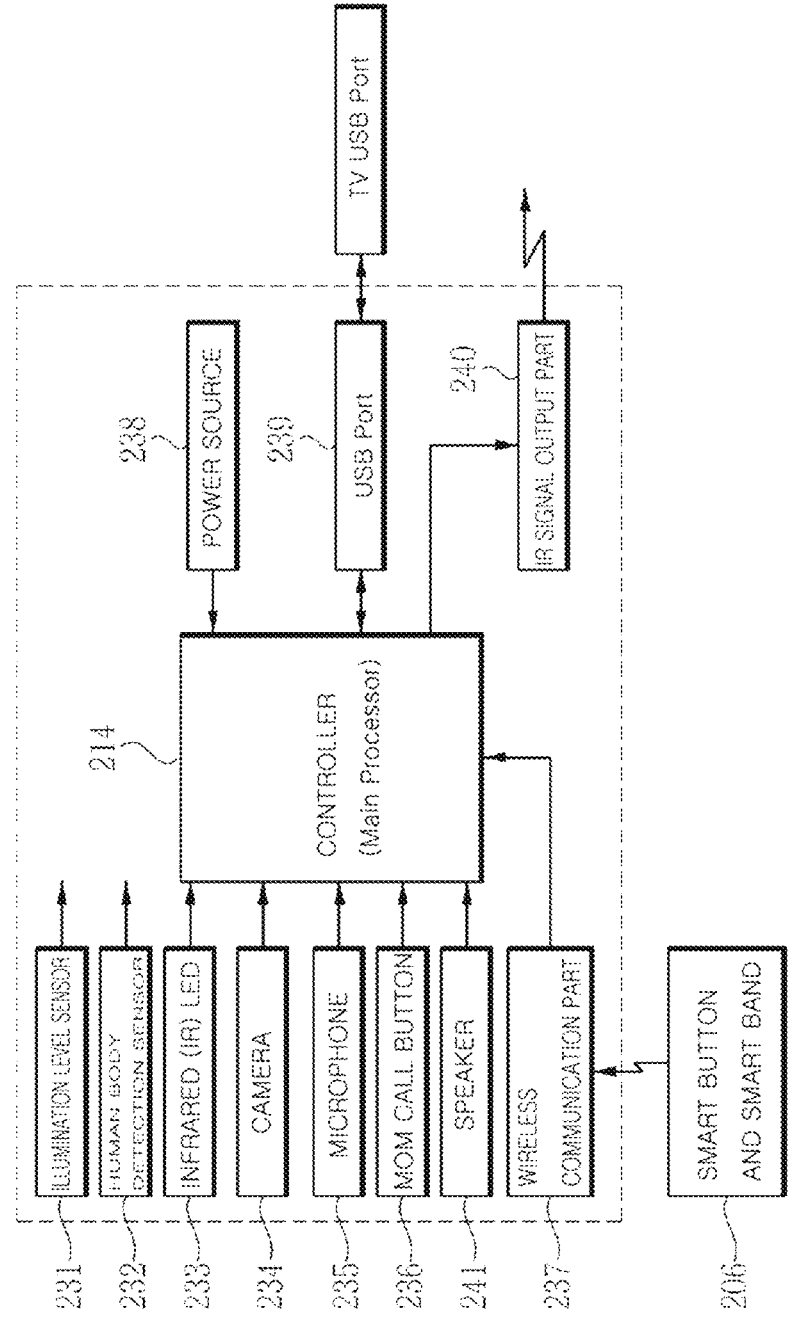
[FIG. 4]

[FIG. 5]
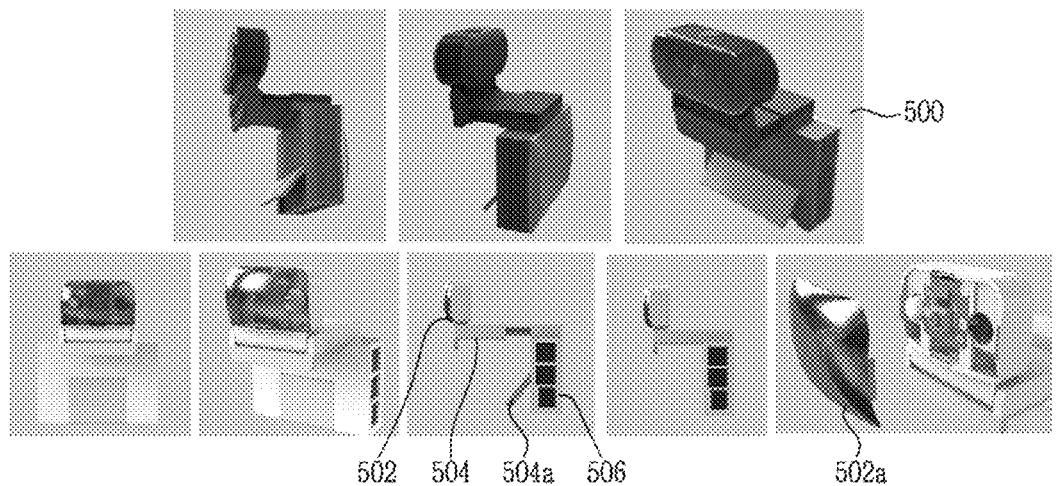
(a)
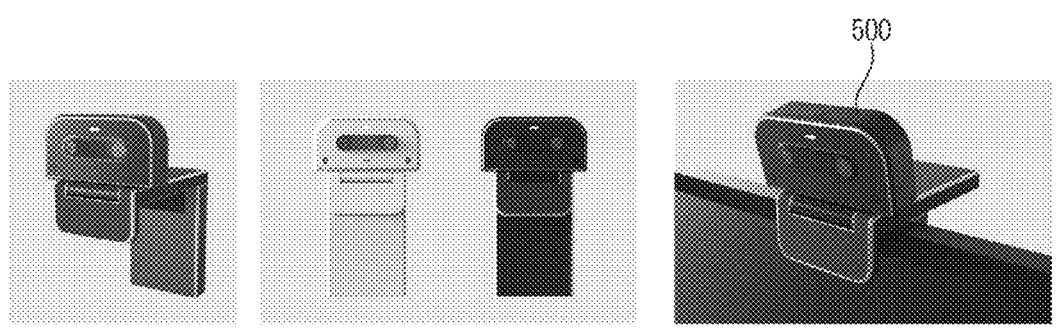
(b)

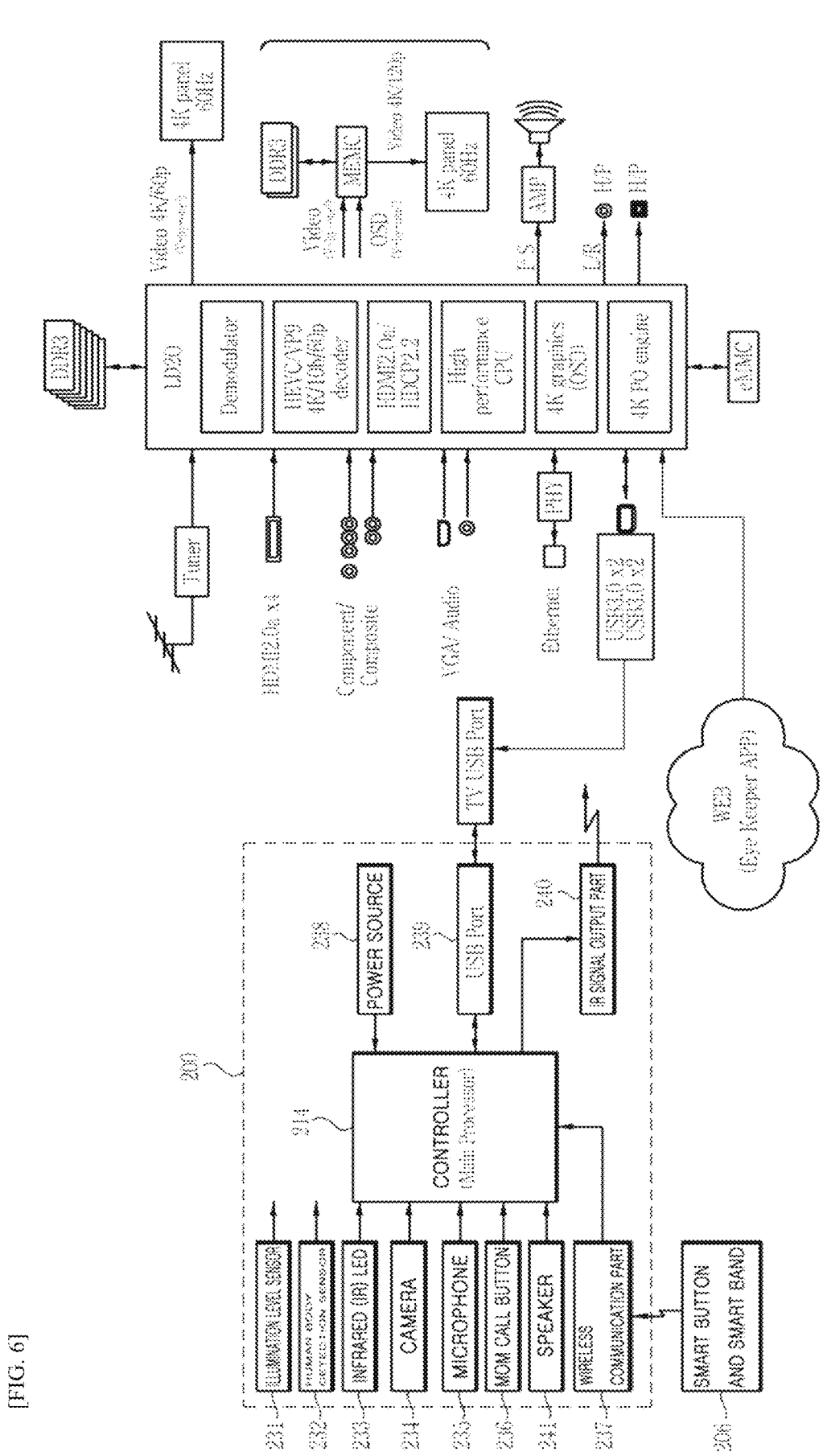
[FIG. 6]

[FIG. 7]
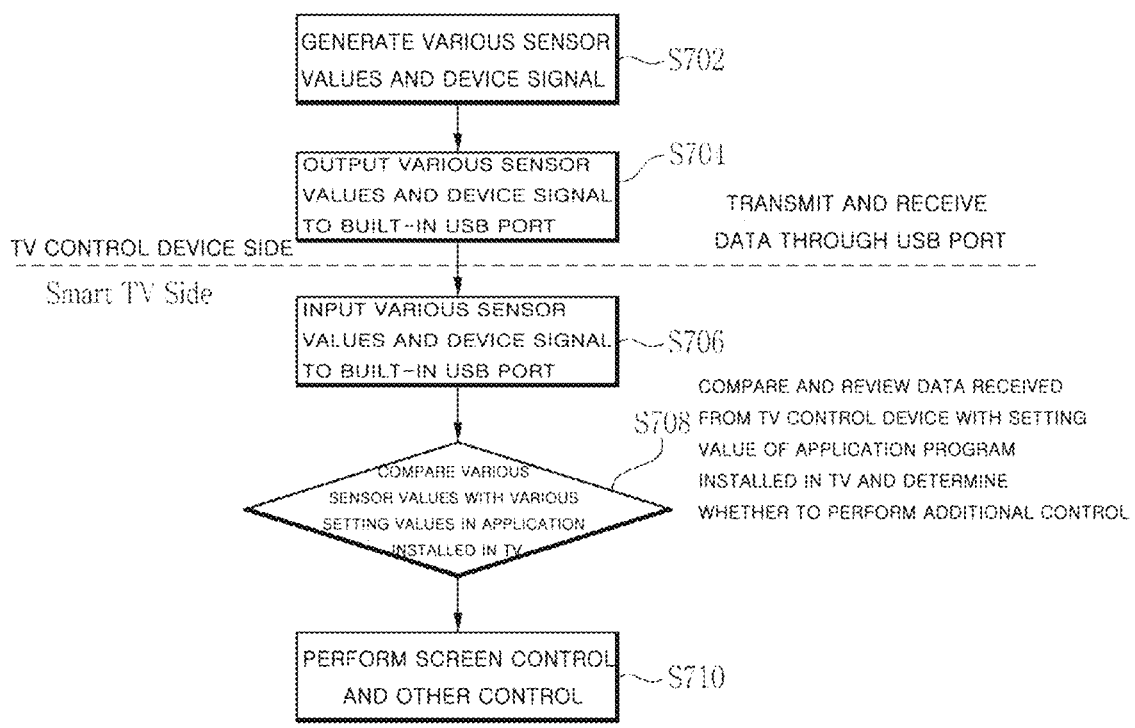

[FIG. 8]
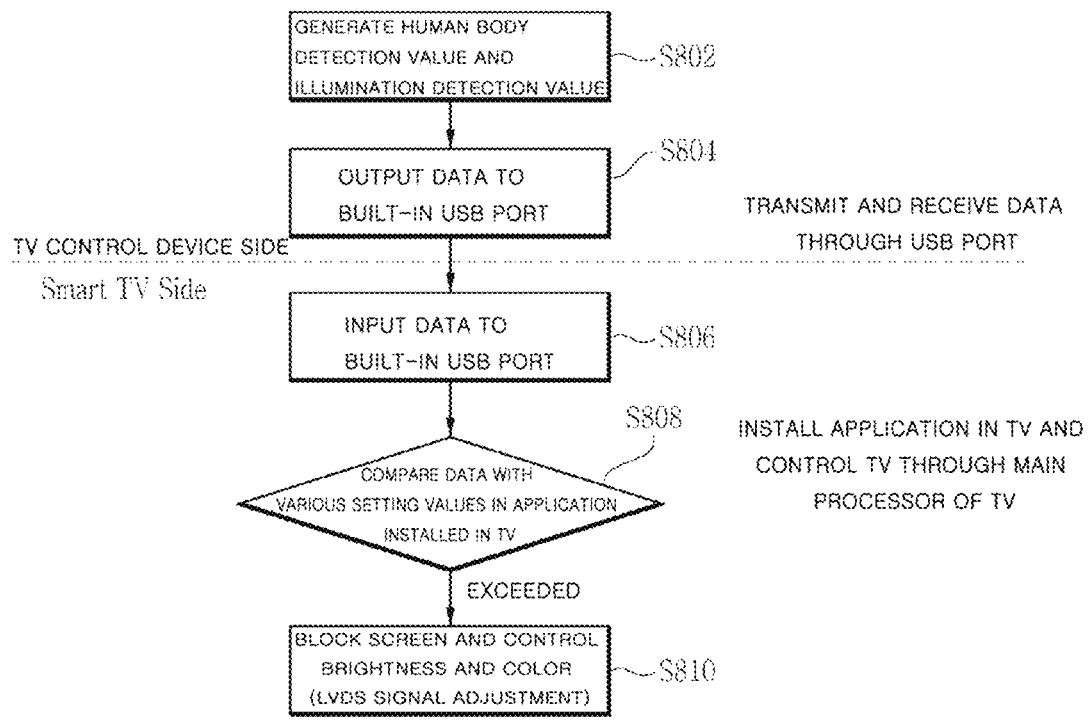
[FIG. 9]
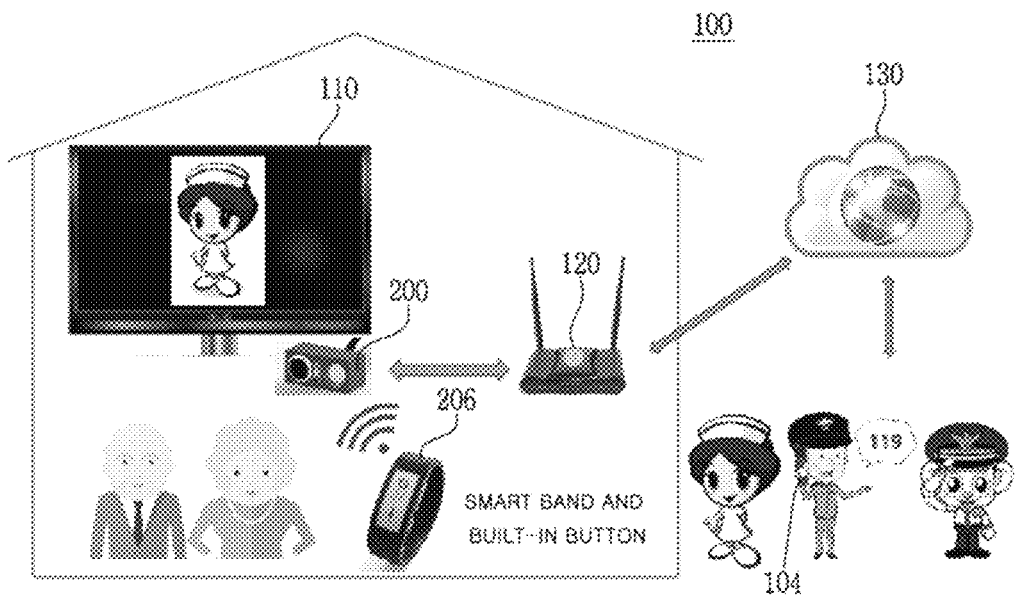

[FIG. 10]
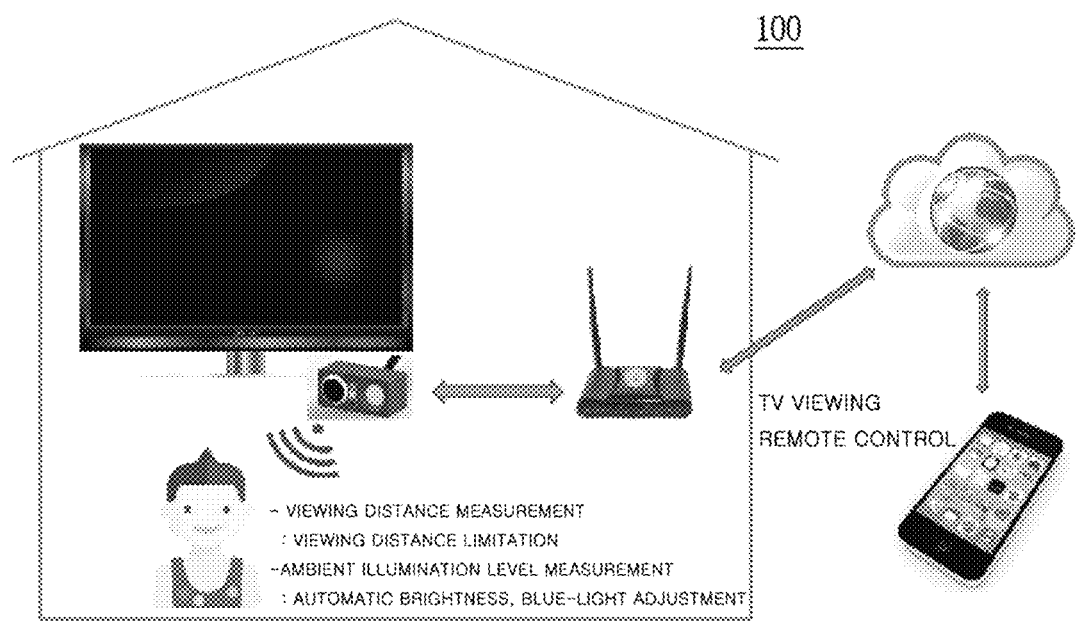

[FIG. 11]
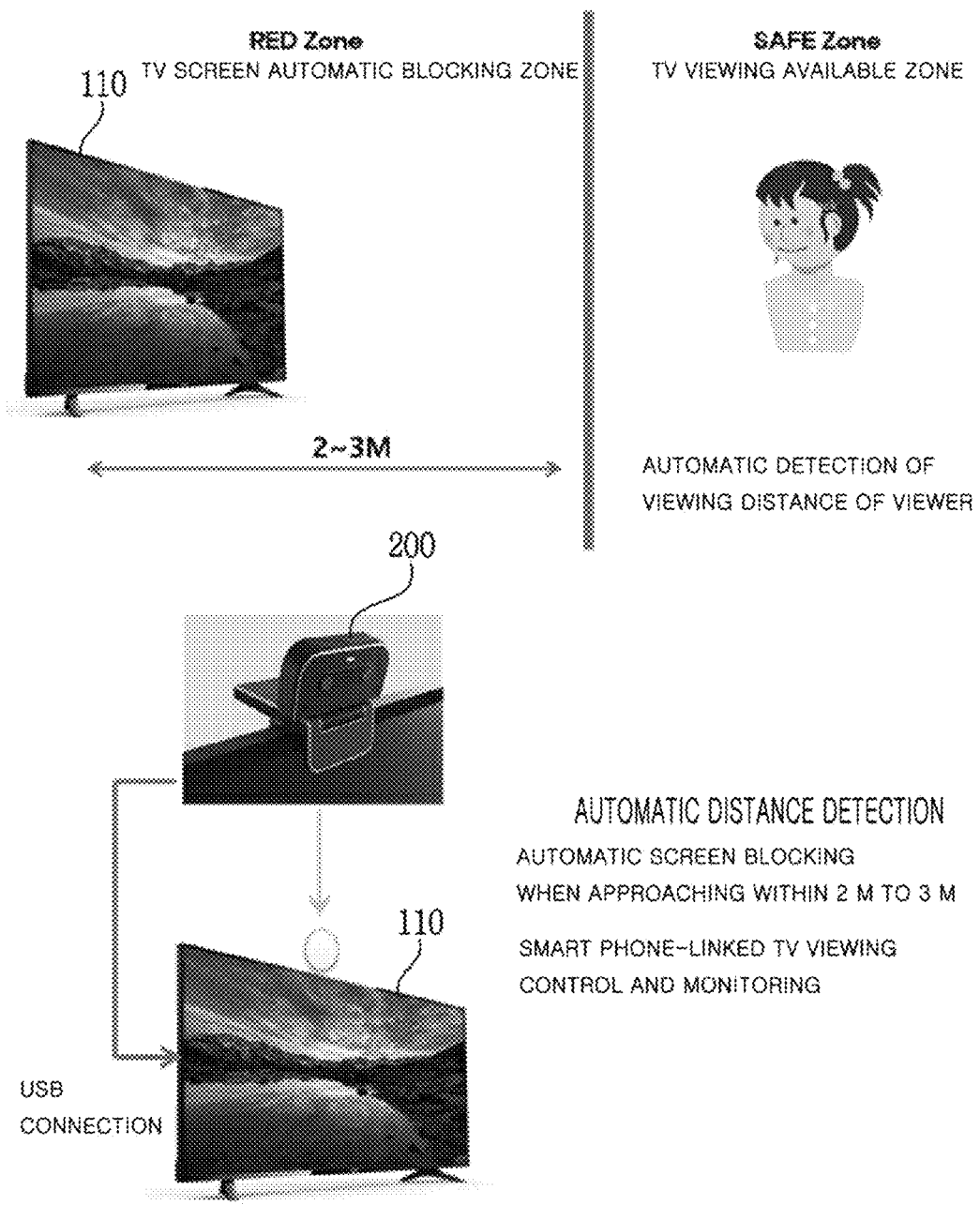

[FIG. 12]
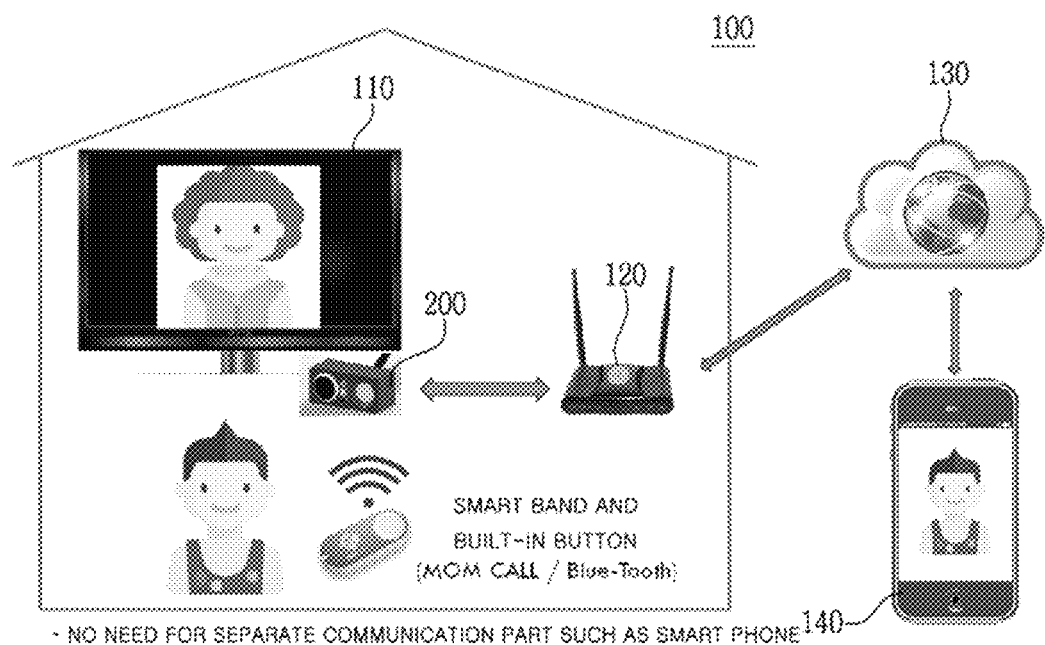

[FIG. 13]
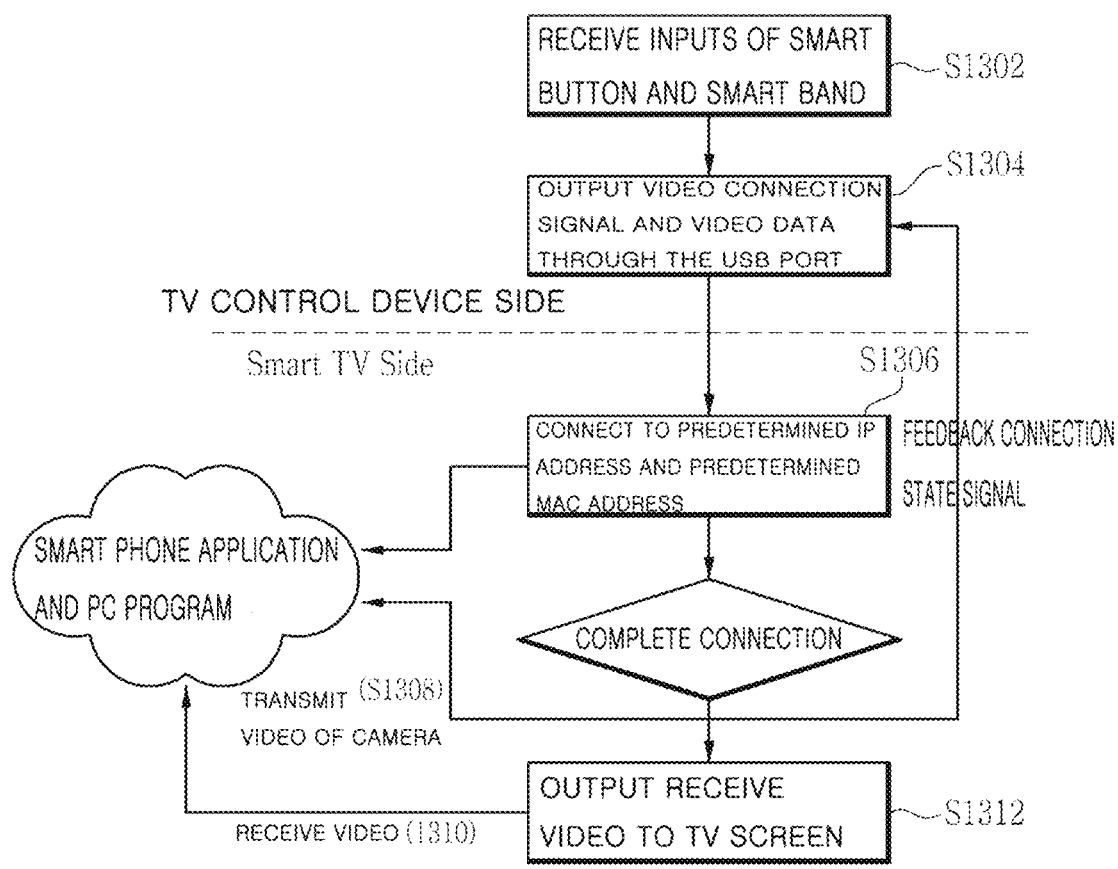

[FIG. 14]
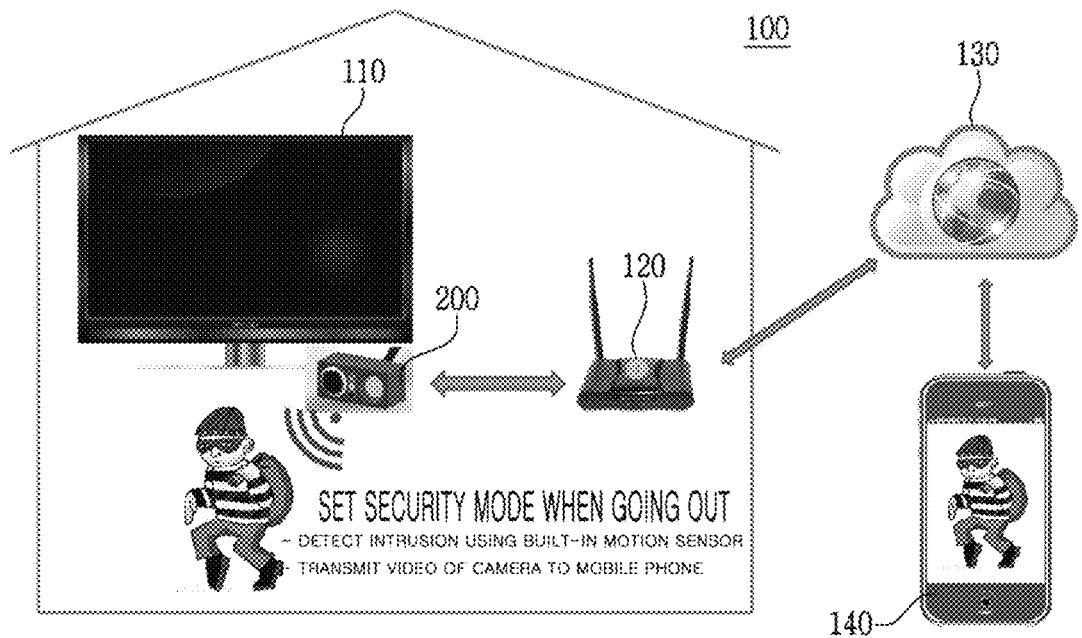
[FIG. 15]
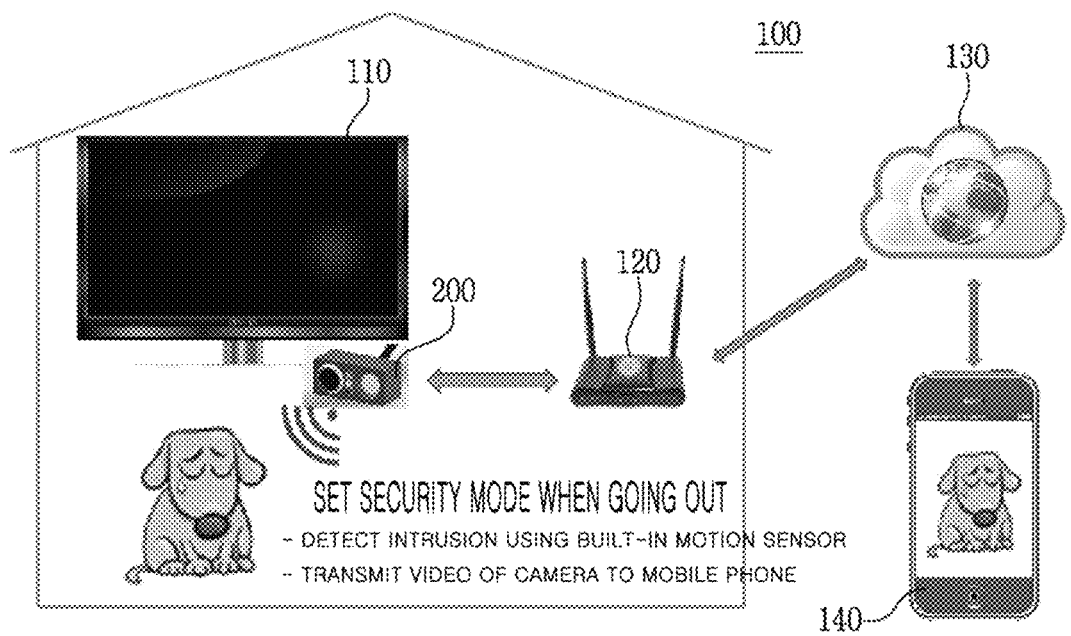

TV CONTROL SYSTEM AND TV CONTROL DEVICE SUITABLE THEREFOR

TECHNICAL FIELD

The present invention relates to a television (TV) control device for screen blocking according to a viewing distance and adjusting a screen brightness according to an ambient illumination level, and more particularly, to a TV control system capable of controlling TV viewing through the Internet and a smartphone, and a TV control device suitable therefor.

BACKGROUND ART

With the advent of smart televisions (TVs) provided with multiple functions and directly connected to the Internet, the TV is breaking away from the classical image reception and limited information exchange (e.g., TV home shopping) through antennas, cables, or set-top boxes. The era in which various video-on-demand (VOD) services and other Internet services can be directly utilized through the Internet has arrived.

Consequently, utilization and dependence on TVs have increased, and various TV service markets through the Internet are rapidly growing.

In addition, smart TV services through the Internet are very simplified and provide a convenient environment from the user's point of view because of using only an Internet connection such as Wi-Fi or Ethernet without connecting to a separate video terminal such as a high-definition multimedia interface (HDMI) port through the existing cable and the existing set-top box. In line with the flow of time, services relating to a service speed and quality of the Internet are rapidly developing day by day.

FIG. 1 shows diagrams illustrating examples of a main screen of a smart TV that is currently being released in Korea.

As shown in FIG. 1, it can be confirmed that there are various services through the Internet.

Modern people spend a considerable amount of time watching TV. It is recommended to watch TV from an appropriate distance and for an appropriate amount of time so as to protect eyesight and maintain health.

However, the reality is that a TV viewing distance is not well observed for children and infants and excessive TV viewing has a negative effect.

Despite these problems, parents do not have enough measures to control TV viewing when their children are not watching the TV continuously or the TV viewing distance is not observed, and thus excessive verbal abuse and corporal punishment may occur to children such that family strife that worsens relations with the children may occur.

In addition, recently, as TVs become larger and are developed, various games can be played through TV screens by combining game consoles with the TVs, and various age groups from infants to teenagers seek pleasure through the TVs.

As described above, TV viewing accounts for a large portion of family strife, and as of now, a solution is needed to control the TV viewing.

DISCLOSURE

Technical Problem

The present invention is directed to providing a television (TV) control system capable of limiting TV viewing by installing an external TV control device (eye-keeper) through a universal serial bus (USB) in a smart TV and installing a separate application in the smart TV.

The present invention is also directed to providing a TV control device suitable for the above TV control system.

Technical Solution

One aspect of the present invention provides a television (TV) control system for limiting viewing of a smart TV and controlling screen brightness, which includes a TV control device configured to generate a viewing distance detection value and an illumination level detection value, input a setting value transmitted from a smartphone, and transmit a human body distance detection value, the illumination level detection value, the setting value, and a control signal to a smart TV; the smart TV configured to receive the viewing distance detection value, the illumination level detection value, and the setting value which are transmitted from the TV control device, perform screen blocking and screen brightness adjustment, and change a distance and time setting value in response to the control signal; a smartphone configured to generate and transmit a control signal for changing distance information and a control signal for changing time setting to the TV control device; and a router connected to the smartphone and the TV control device through a communication network and configured to relay the setting value and the control signal transmitted from the smartphone to the TV control device, and an application configured to perform viewing distance limitation, screen brightness control, and changing of the distance and time setting values may be installed in the smart TV.

The smart TV may compare a predetermined distance limitation setting value with the viewing distance detection value received from the TV control device and determine whether to perform screen blocking, and when the screen blocking is required, the smart TV may perform the screen blocking.

The TV control device may count viewing time in addition to the detection of a viewing distance and transmit the counted viewing time to the smart TV, and when it is determined that the counted viewing time is greater than or equal to a predetermined time, the smart TV may block an output of the video signal.

The smart TV may adjust an R channel signal, a G channel signal, and a B channel signal on the basis of the received illumination level detection value to control brightness of a TV screen according to an external illumination level.

The smart TV may control blue light by adjusting an adjustment ratio of the B channel signal according to a predetermined blue light adjustment ratio.

The TV control device may include a universal serial bus (USB) port connected to the smart TV and configured to transmit and receive the viewing distance detection value, the illumination level detection value, and the control signal to and from the smart TV; a human body detection sensor configured to emit infrared (IR) light to a subject, receive the IR light reflected from the subject, generate the viewing distance detection value according to a distance from the subject, and transmit the viewing distance detection value to a controller; an illumination level sensor configured to measure an intensity of ambient light, generate the illumination level detection value, and transmit the illumination level detection value to the controller; a built-in microphone configured to collect a surrounding audio signal and transmit the surrounding audio signal to the controller; a built-in speaker configured to output a warning audio signal; a built-in camera configured to capture a surrounding video and transmit the captured surrounding video to the controller; an IR signal output part configured to output an IR signal for controlling the smart TV; and a controller configured to transmit the viewing distance detection value, the illumination level detection value, and the control signal transmitted from the smartphone to the smart TV.

The TV control device may further include a wireless communication part configured to communicate with an external router in a wireless manner.

The controller may transmit the viewing distance detection value generated from the human body detection sensor to the smartphone through the wireless communication part and the router, and when it is determined that the viewing distance detection value is within a predetermined distance, the smartphone may generate a control signal for blocking a video signal and transmit the control signal to the TV control device, and in response to the control signal for blocking the video signal transmitted from the smartphone, the TV control device may generate a signal for blocking a video output of the smart TV.

When it is determined that the viewing distance detection value is within predetermined distance information, the smartphone may generate warning audio information and transmit the warning audio information to the TV control device, and the TV control device may output the warning audio information through the built-in speaker.

The controller may count the viewing time from the moment a viewer is detected by the human body detection sensor and transmit the counted viewing time to the smartphone through the wireless communication part and the router, and when it is determined that the counted viewing time is greater than or equal to a predetermined time, the smartphone may generate a control signal for blocking the video signal and transmit the control signal to the TV control device, and in response to the control signal for blocking the video signal, the TV control device may generate a signal for blocking a video output of the smart TV.

When it is determined that the counted viewing time is greater than or equal to predetermined time information, the smartphone may generate warning audio information and transmit the warning audio information to the TV control device, and the TV control device may output the warning audio information through the built-in speaker.

The smartphone may generate a control signal for changing predetermined distance information and transmit the control signal to the TV control device, the controller may transmit a control signal for changing distance information to the smart TV, and in response to the control signal for changing distance information, the smart TV may change the distance information.

The smartphone may generate a control signal for changing predetermined time information and transmit the control signal to the TV control device, the controller may transmit a control signal for changing time information to the smart TV, and in response to the control signal for changing time information, the smart TV may change the distance information and the time information.

The controller may include a mom call button configured to request a video call, and when a call button on signal for performing a video call is received from the mom call button or an external smart button and smart band, the TV control device may generate a video call request signal for requesting a video call and transmit the video call request signal to the smartphone having a registered phone number through the router.

When a crime prevention mode setting signal is received from the smartphone, the controller may drive the human body detection sensor to emit IR light to the subject and receive the IR light reflected from the subject to detect movement of the subject, and when a sensor output value generated due to the movement detected from the human body detection sensor is received, the controller may generate a control signal for automatically capturing the subject, transmit the control signal to the built-in camera, and drive the built-in microphone to acquire and collect surrounding audio information, and the controller may transmit the video information captured by the built-in camera and the audio information collected through the built-in microphone to the smartphone through the wireless communication part and the router.

When an alarm button provided on one side of the smartphone is selected, the smartphone may generate an alarm button selection signal and transmit the alarm button selection signal to the controller through the router, and in response to the alarm button selection signal, the controller may output predetermined alarm audio information through the built-in speaker.

When the controller receives a sensor output value indicating that there is no movement detected from the human body detection sensor for a predetermined time, the controller may generate a capturing interruption signal and transmit the capturing interruption signal to the built-in camera.

The controller may further include an IR light-emitting diode (LED), and when a crime prevention mode setting signal is received, the controller may receive an illumination level detection value obtained by measuring an intensity of ambient light from the illumination level sensor, and when it is determined that the received illumination level detection value is less than or equal to a predetermined reference value, the controller may drive the IR LED and execute the crime prevention mode responding to a low illumination level or even at night time.

When a setting signal of a companion animal care mode is received, the controller may detect an ambient noise through the built-in microphone, and when a specific sound wave of a pet dog over a certain level continues, the controller may generate a TV power ON signal for turning power of the smart TV on, transmit the TV power ON signal to the smart TV, transmit the video signal and the audio signal of the built-in camera and the built-in microphone to the smartphone, and transmit video and audio signals of the smartphone to the smart TV.

When the controller receives a response signal from the smartphone with respect to the video call request signal, the controller may perform video and audio call protocols to allow the video call to be performed, configure a communication environment in which the video call is capable of being performed between the smart TV and the smartphone, transmit the video captured by the built-in camera to the smartphone, receive a video data signal and an audio data signal of the smartphone through the router, output the video data signal and the audio data signal to the smart TV, and perform the video call between the built-in camera, the smart TV, and the smartphone.

Another aspect of the present invention provides a television (TV) control device connected to a smart TV and configured to perform limitation on TV viewing and control screen brightness, which includes a USB port connected to an external smart TV and configured to transmit and receive the viewing distance detection value, the illumination level detection value, and the control signal to and from the smart TV; a human body detection sensor configured to emit infrared (IR) light to a subject, receive the IR light reflected from the subject, generate the viewing distance detection value according to a distance from the subject, and transmit the viewing distance detection value to a controller; an illumination level sensor configured to measure an intensity of ambient light, generate the illumination level detection value, and transmit the illumination level detection value to the controller; an IR LED configured to emit IR light to a subject; a built-in microphone configured to collect a surrounding audio signal and transmit the surrounding audio signal to the controller; a built-in speaker configured to output a warning audio signal; a built-in camera configured to capture a surrounding video and transmit the captured surrounding video to the controller; an IR signal output part configured to output an IR signal for controlling the external smart TV; and a controller configured to transmit the viewing distance detection value, the illumination level detection value, and the control signal to the external smart TV through the USB port.

The TV control device may further include a wireless communication part configured to communicate with an external router in a wireless manner.

The controller may transmit the viewing distance detection value generated from the human body detection sensor and the illumination level detection value generated from the illumination level sensor to the smartphone through the wireless communication part and the router.

The controller may transmit a video signal blocking request signal, which is transmitted from the smartphone, to the smart TV through the USB port.

The controller may transmit a control signal for changing distance information and a control signal for changing time information, which are transmitted from the smartphone, to the smart TV through the USB port.

The controller may output warning audio information, which is transmitted from the smartphone, through the built-in speaker.

In response to the alarm button selection signal transmitted from the smartphone in the crime prevention mode, the controller may output alarm audio information through the built-in speaker.

The TV control device may further include a main body, the body may be made of a plastic material, and the body may include a head portion installed to expose the human body detection sensor, the illumination level sensor, and the built-in camera to the outside, a body portion configured to support the head portion, and a leg portion connected to the body portion.

The head may include a transparent cover configured to protect the illumination level sensor, the human body sensor, and the built-in camera.

The body portion may include two portions capable of adjusting a length of the body portion in a lengthwise direction, the two portions may be slidably coupled, and the USB port may be exposed on a side surface of the body portion to the outside.

The body portion may be hinge-coupled to a cover unfolded to a front side and may be mounted on a flat surface by unfolding the cover to the front side.

Advantageous Effects

In accordance with a television (TV) control system according to the present invention, there is an effect of being capable of protecting eyesight of a viewer by allowing a TV control device configured to detect a viewing distance and a TV to perform screen blocking according to a viewing distance detection value transmitted from the TV control device.

In accordance with the TV control system according to the present invention, there is an effect of implementing an interactive content control service by connecting the TV to a smartphone through a communication network, thereby performing a two-way video call, a crime prevention function, and companion animal care.

In accordance with the present invention, a two-way video call between the TV and the smartphone can be supported with only a simplified button operation in an emergency situation for the elderly, infants, and children for whom it is inconvenient to use a separate communication part.

DESCRIPTION OF DRAWINGS

FIG. 1 shows diagrams illustrating examples of a main screen of a smart television (TV) that is currently being released in Korea.

FIG. 2 is a diagram illustrating a TV control system according to one embodiment of the present invention.

FIG. 3 is a diagram illustrating an installation state of the TV control device according to the present invention.

FIG. 4 is a block diagram illustrating a configuration of the TV control device according to the present invention.

FIG. 5 shows diagrams illustrating an appearance configuration of the TV control device according to the present invention.

FIG. 6 is a diagram illustrating a connection state between the TV control device and a smart TV according to the present invention.

FIG. 7 is a flowchart illustrating a basic operation of the TV control system according to the present invention.

FIG. 8 is a flowchart illustrating an example of performing viewing limitation and screen brightness control in the TV control system according to the present invention.

FIG. 9 is a block diagram illustrating another example of a TV viewing distance limiting system according to the present invention.

FIG. 10 is a diagram illustrating that viewing limitation is performed using the TV control system according to the present invention.

FIG. 11 is a diagram illustrating an example of detecting a viewing limitation distance.

FIG. 12 is a diagram illustrating that a two-way video call is performed using the TV control system according to the present invention.

FIG. 13 is a flowchart illustrating a method of performing the two-way video call using the TV control system according to the present invention.

FIG. 14 is a diagram illustrating an example of performing a crime prevention function using the TV control system according to the present invention.

FIG. 15 is a diagram illustrating an example of performing companion animal care using the TV control system according to the present invention.

MODES OF THE INVENTION

The present invention may be modified into various forms and may have a variety of embodiments, and therefore, specific embodiments will be illustrated in the drawings and described in detail. The embodiments, however, are not to be taken in a sense which limits the present invention to the specific embodiments and should be construed to include modifications, equivalents, or substituents within the spirit and technical scope of the present invention. In describing each drawing, similar reference numerals are assigned to similar components.

Although the terms "first," "second," "A," "B," and the like may be used herein to describe various components, these components should not be limited to these terms. The terms are used only for the purpose of distinguishing one component from another component. For example, without departing from the scope of the present invention, a first component may be referred to as a second component, and similarly, a second component may also be referred to as a first component. The term "and/or" includes a combination of a plurality of related listed items or any one item of the plurality of related listed items.

When a component is referred to as being "connected" or "coupled" to another component, the component may be directly connected or coupled to another component, but it should be understood that sill another component may be present between the component and another component. On the contrary, when a component is referred to as being "directly connected," or "directly coupled" to another component, it should be understood that still another component may not be present between the component and another component.

The terms used herein are employed to describe only specific embodiments and are not intended to limit the present invention. Unless the context clearly dictates otherwise, the singular form includes the plural form. It should be understood that the terms "comprise," "include," and "have" specify the presence of stated herein features, numbers, steps, operations, components, elements, or combinations thereof but do not preclude the presence or possibility of adding one or more other features, numbers, steps, operations, components, elements, or combinations thereof.

Unless otherwise defined, all terms including technical or scientific terms used herein have the same meaning as commonly understood by those skilled in the art to which the present invention pertains. General terms that are defined in a dictionary shall be construed as having meanings that are consistent in the context of the relevant art and are not to be interpreted as having an idealistic or excessively formalistic meaning unless clearly defined in the present application.

Hereinafter, a configuration and an operation of the present invention will be described in detail with reference to the accompanying drawings.

FIG. 2 is a diagram illustrating a television (TV) control system according to one embodiment of the present invention.

Referring to FIG. 2, the TV control system according to the present invention includes a smart TV 110, a router 120, a TV control device 200, a communication network 130, and a smartphone 140.

The TV control system 100 according to the present invention performs viewing limitation and screen brightness control of the smart TV 110 using the TV control device 200 connected to the smart TV 110 through a universal serial bus (USB) port and performs a two-way call with the external smartphone 140 using the smart TV 110.

The TV control device 200 detects a viewing distance and an illumination level and transmits the viewing distance and the illumination level to the smart TV 110 through the USB port, and the smart TV 110 performs viewing distance limitation and screen brightness control on the basis of the received viewing distance detection value and the received illumination level detection value.

The smart TV 110 is equipped with the USB port, performs an information processing function, and includes various types of TVs such as network TVs, Internet TVs, and smart TVs.

The router 120 is an Internet router and may operate in a wired or wireless manner. The router 120 receives multimedia data including video information and a control signal and transmits the multimedia data and the control signal to the smart TV 110 and the TV control device 200.

The communication network 130 may include not only a data communication network including a local area network (LAN), a metropolitan area network (MAN), a wide area network (WAN), the Internet, but also a telephone network and include both a wired network and a wireless network.

The smartphone 140 includes devices, such as a desktop and a tablet, as long as they can provide a web service (Internet communication) and include an input function, a communication function, a screen output function, and a touch screen function.

A service application for interworking with the router 120 and the TV control device 200 is embedded in the smartphone 140 so as to perform a TV control function, a screen brightness control function, a video call, a crime prevention function, a companion animal care function, and the like.

The TV control device 200 is connected to the smartphone 140 through the communication network 130 to perform two-way communication.

An application for interworking with the TV control device 200 is installed in the smart TV 110. The application may be downloaded through the communication network 130.

The smartphone 140, the TV control device 200, and the router 120 each have their own Internet protocol (IP) addresses or media access control (MAC) addresses and are connected through the communication network 130.

Meanwhile, the TV control device 200 is connected to the router 120 through a wireless communication part 237.

FIG. 3 is a diagram illustrating an installation state of the TV control device according to the present invention.

Referring to FIG. 3, the TV control device 200 according to the present invention includes a human body detection sensor, a camera, an illumination level sensor, and an infrared (IR) light-emitting diode (LED) and is electrically connected to the smart TV 110 through a USB connection line. In addition, the TV control device 200 may be mounted on an upper portion of the smart TV 110 or mounted in the vicinity of the smart TV 110.

FIG. 4 is a block diagram illustrating a configuration of the TV control device according to the present invention.

Referring to FIG. 4, the TV control device 200 according to the present invention includes an illumination level sensor 231, a human body detection sensor 232, an IR LED 233, a built-in microphone 234, a built-in camera 235, a mom call button 236, the wireless communication part 237, a power source 238, a USB port 239, an IR signal output part 240, and a controller 214.

Here, the wireless communication part 237 may be coupled to the controller 214 in a detachable manner or a built-in manner.

The illumination level sensor 231 measures an intensity of ambient light, generates an illumination level detection value, and transmits the illumination level detection value to the controller 214.

The human body detection sensor 232 emits IR light to a subject, receives the IR light reflected from the subject, detects movement of the subject, generates a viewing distance detection value with respect to the subject according to a sensor output value generated on the basis of the detected movement, and transmits viewing distance detection value to the controller 214.

The IR LED 233 emits IR light to the subject to facilitate image capturing even in a condition in which an illumination level is low, such as at night time.

The built-in microphone 234 collects a voice of a TV viewer, generates an audio signal, and transmits the generated audio signal to the controller 214.

The built-in camera 235 captures an image of the TV viewer, acquires an image signal, and transmits the acquired image signal to the controller 214.

The mom call button 236 is pressed by a manipulation of the TV viewer and is for generating a video call request signal.

The wireless communication part 237 is for wireless connection with a smart button and smart band 206 and for Internet connection with the router 120.

The IR signal output part 240 is for applying a power-on signal to the smart TV 110.

The TV control device 200 transmits detection values detected by the built-in sensors 231 and 232 to the smart TV 110 through the USB port 239. The application installed in the smart TV 110 refers to the detection values transmitted from the TV control device 200 and performs viewing limitation, screen brightness control, and color control (blue light setting).

The human body detection sensor 232 emits IR light to the viewer, receives the IR light reflected from the viewer, calculates distance information, and transmits a calculated viewing distance detection value to the controller 214. The controller 214 transmits the viewing distance detection value to the smart TV 110 through the USB port 239.

When it is determined that the received viewing distance detection value is within a preset distance, the smart TV 110 blocks an output of a video signal.

Meanwhile, the controller 214 counts viewing time from the moment the viewer is detected by the human body detection sensor 232 and transmits the counted viewing time to the smart TV 110.

When it is determined that the counted viewing time is greater than or equal to a predetermined time, the smart TV 110 blocks the output of the video signal.

Meanwhile, the smartphone 140 connects to the TV control device 200 through the router 120, searches information on the distance between the viewer and the smart TV 110 and information on the counted viewing time, generates a control signal to block the video signal, and transmits the control signal to the TV control device 200 through the communication network 130 and the router 120.

When the controller 214 receives the control signal for blocking the video signal from the smartphone 140, the controller 214 transmits the control signal to the smart TV 110, and the smart TV 110 blocks the output of the video signal in response to the control signal. In order to block the output of the video signal, the controller 214 may output a power-off signal through the IR signal output part 240.

The smartphone 140 may generate a control signal for changing predetermined distance information and transmit the control signal to the TV control device 200 or may generate a control signal for changing predetermined time information and transmit the control signal to the TV control device 200.

The controller 214 may transmit a control signal for changing distance information and a control signal for changing time information to the smart TV 110, and the smart TV 110 may change the distance information and the time information in response to the control signals. The control signal for changing the distance information includes distance information to be newly set, and the control signal for changing the time information includes time information to be newly set.

Meanwhile, when it is determined that the viewing distance detection value is within a predetermined distance, the smartphone 140 generates warning audio information to move away from the smart TV 110 by several meters and transmits the warning audio information to the TV control device 200.

When it is determined that the counted viewing time is greater than or equal to a predetermined time, the smartphone 140 generates warning audio information for stopping TV viewing and transmits the warning audio information to the TV control device 200.

The TV control device 200 may output these warning audio information through the built-in microphone 234 to give a warning to the viewer to increase the viewing distance or stop the TV viewing.

The controller 214 generates a user-specific number required for mapping between the router 120 located in a customer premise and the smartphone 140 owned by a user. Here, the user-specific number is a key value capable of distinguishing the smartphone 140 communicating with an interactive digital TV. For example, a subscriber number, a router IP address, a subscriber phone number, a router MAC address, or a subscriber resident registration number may be used as the user-specific number.

The controller 214 performs a function of receiving a 1:1 mapping request processing process with the smartphone 140 from the router 120 and an interactive TV content control signal, which is received from the smartphone 140 according to interactive content execution, from the router 120, a function of transmitting an event signal to the router 120, which is to be transferred to the smartphone 140, and a function of transmitting and receiving various pieces of data to and from the router 120 so as to transmit and receive interactive contents to and from the smartphone 140.

The smartphone 140 connects to the TV control device 200 through the router 120, searches information on the distance between the viewer and the TV and information on the counted viewing time, generates a control signal to block a video data signal, and transmits the control signal to the controller 214 of the TV control device 200 through the communication network 130 and the router 120.

When the controller 214 receives the control signal for blocking the video data signal from the smartphone 140, the controller 214 transmits a control signal for requesting to block the video signal to the TV, and the TV blocks the video signal in response to the control signal.

The smartphone 140 may generate a control signal for changing the predetermined distance information and transmit the control signal to the controller 214 of the TV control device 200 or may generate a control signal for changing the predetermined time information and transmit the control signal to the TV control device 200.

When calculated distance information is detected within the predetermined distance information, the smartphone 140 generates warning audio information to move several meters away from the smart TV 110 and transmits the warning audio information to the controller 214 of the TV control device 200.

When it is determined that the counted viewing time is greater than or equal to the predetermined time information, the smartphone 140 generates warning audio information to stop TV viewing and transmits the warning audio information to the controller 214 of the TV control device 200.

FIG. 5 shows diagrams illustrating an appearance configuration of the TV control device according to the present invention.

Referring to FIG. 5, the TV control device according to the present invention includes a main body 500 accommodating the components shown in FIG. 4. The main body 500 may be made of a plastic material and includes a head portion 502, a body portion 504, and a leg portion 506. FIGS. 5A and 5B show two versions with different head shapes.

The head portion 502 has a transparent cover 502a, and an illumination level sensor 231, a human body detection sensor 232, and a built-in camera 235, which should be exposed to the outside, are installed in the head portion 502. The body portion 504 is for coupling the head portion 502 to the leg portion 504, and an example having a cross-section bent in a "⌐" shape is disclosed in FIG. 5. The controller 214 and other components may be installed in the head portion 502 and may also be installed in the body portion 504 or the leg portion 506. The wireless communication part 237 may be embedded and may also be installed in a detachable manner.

The head portion 502 is installed above the body portion 504 and the leg portion 506 is installed therebelow. The body portion 504 includes two portions capable of adjusting a length of the body portion 504 in a lengthwise direction, and the two portions are slidably coupled (see FIG. 5A).

When the TV control device 200 is installed on the upper portion of the smart TV 110, the length of the body portion 504 is adjusted and fixed so that the TV control device 200 may be firmly coupled to the smart TV 110 (see FIG. 5B).

Meanwhile, a cover 504a, which is unfolded, is hinge-coupled to a front side of the body portion 504. By unfolding the cover 504a to the front side, the TV control device 200 may be mounted on a flat surface. The USB port is exposed to the outside on a side surface of the body portion 504 (see FIG. 5A).

FIG. 6 is a diagram illustrating a connection state between the TV control device and a smart TV according to the present invention.

Referring to FIG. 6, the TV control device 200 according to the present invention and the smart TV 110 are connected to each other through a USB connection line.

The TV control device 200 detects a viewing distance and an illumination level and transmits the viewing distance and the illumination level to the smart TV 110 through the USB port 239, and the smart TV 110 performs viewing distance limitation and screen brightness control on the basis of the received viewing distance detection value and the received illumination level detection value. Although FIG. 6 shows an internal configuration of the smart TV 110, this is merely an example for illustrating that an Internet function and an information processing function are performed, and as long as these functions are performed, it is possible to have a different configuration.

FIG. 7 is a flowchart illustrating a basic operation of the TV control system according to the present invention.

Referring to FIG. 7, the TV control device 200 generates various detection values and outputs the generated detection values and a control signal to the USB port 239 (S702 and S704).

The smart TV 110 inputs the detection values and the control signal transmitted from the TV control device 200 through its own USB port (S706).

The smart TV 110 compares various predetermined setting values with the detection values and performs screen blocking and screen brightness control according to the comparison results (S708 and S710).

In addition, in response to the control signal, the smart TV 110 performs screen blocking, power input, and setting value change.

FIG. 8 is a flowchart illustrating an example of performing viewing limitation and screen brightness control in the TV control system according to the present invention.

First, in the viewing limitation, the controller 214 of the TV control device 200 receives a viewing distance detection value detected from the human body detection sensor and outputs the viewing distance detection value to the USB port 239 (S802 and S804).

The smart TV 110 inputs the viewing distance detection value transmitted from the TV control device 200 through its own USB port (S806).

The smart TV 110 compares a predetermined distance limitation setting value with the received viewing distance detection value and determines whether to perform screen blocking, and when the screen blocking is required, the smart TV 110 performs the screen blocking (S808 and S810).

Next, in the screen brightness control, the controller 214 of the TV control device 200 transmits an illumination level detection value received from the illumination level sensor 231 to the smart TV 110 through the USB port 239 (S802 and S804).

The smart TV 110 adjusts an R channel signal, a G channel signal, and a B channel signal on the basis of the received illumination level detection value to control brightness of a TV screen according to an external illumination level (S806 to S810). That is, according to an amount of ambient light, the brightness of the screen is controlled to be increased in a bright place, and the brightness of the screen is controlled to be decreased in a dark place so that eyesight of the TV viewer may be automatically protected.

In addition, the smart TV 110 controls blue light by adjusting an adjustment ratio of the B channel signal according to a predetermined blue light adjustment ratio.

An application for screen blocking and screen brightness control is installed in the smart TV 110. The application is downloaded through the communication network 130 and performs the screen blocking and the screen brightness control according to a detection value input to the smart TV 110.

In addition to the above description, the application performs a setting value change and displaying of video and audio provided from the TV control device 200.

FIG. 9 is a block diagram illustrating another example of a TV viewing distance limiting system according to the present invention.

When compared with the system shown in FIG. 2, the system shown in FIG. 9 further includes a smart button and smart band.

A smart button and smart band 206 is connected to the TV control device 200 through the wireless communication part 237.

Since the smart button and smart band 206 is a common device for measuring a heart rate and electrocardiogram, a detailed description thereof will be omitted herein.

In the system shown in FIG. 9, a built-in mom call button 236 installed in the controller 210 or a smart button installed in an external smart button and smart band 206 assists a video call between the smart TV 110 and the smartphone 140 with a simplified button operation in an emergency for the elderly, infants, and children for whom it is inconvenient to use a separate communication method.

When the built-in mom call button 236 is pressed, a call button on signal for a video call is transmitted to the controller 214.

When the smart button of the external smart button and smart band 206 is pressed by a user, a call button on signal for a video call is transmitted to the controller 214 through the wireless communication part 237.

When the call button on signal for performing a video call is received from the built-in mom call button 236 or the external smart button and smart band 206, the controller 214 generates a video call request signal for requesting a video call and transmits the video call request signal to the smartphone 140 having a registered phone number through the router 120.

The controller 214 performs a function of receiving a 1:1 mapping request processing process with the smartphone 140 from the router 120 and an interactive TV content control signal, which is received from the smartphone 140 according to interactive content execution, from the router 120, a function of transmitting an event signal to the router 120, which is to be transferred to the smartphone 140, and a function of transmitting and receiving various pieces of data to and from the router 120 so as to transmit and receive interactive contents to and from the smartphone 140.

For the 1:1 mapping with the router 120, the controller 214 receives a phone number registration request signal from the smartphone 140 through the router 120 and performs registration processing by 1:1 mapping a phone number of the smartphone 140 to the user-specific number of the router 120.

When the controller 214 receives the phone number registration request signal from the smartphone 140 through the router 120, the controller 214 may perform authentication processing using an authentication number to verify validity of the phone number of the smartphone 140.

FIG. 10 is a diagram illustrating that viewing limitation is performed using the TV control system according to the present invention.

Referring to FIG. 10, the smartphone 140 may transmit a control signal of interactive contents to the controller 214 of the TV control device 200 through the router 120 to control TV viewing as a remote control.

FIG. 11 is a diagram illustrating an example of detecting a viewing limitation distance.

Referring to FIG. 11, it can be seen that the TV control system 100 according to the present invention automatically detects the distance between the viewer and the smart TV 110 and notifies the smart TV 110 of the detected viewing distance, and the smart TV 110 determines whether to perform the screen blocking with reference to the detected viewing distance and performs the screen blocking when necessary.

FIG. 12 is a diagram illustrating that a two-way video call is performed using the TV control system according to the present invention.

Referring to FIG. 12, it can be seen that, when the TV control system according to the present invention is used, a separate communication part such as a smartphone is unnecessary, and in case of an emergency, a video call may be made directly with a pre-registered smartphone.

FIG. 13 is a flowchart illustrating a method of performing a two-way video call using the TV control system according to the present invention.

Referring to FIG. 13, when a video call request signal is received from the smart button or the mom call button (S1302), the TV control device 200 outputs a video connection signal to the router 120 and outputs video data to the smart TV 110 through the USB port (S1304).

The router 120 requests a connection to the smartphone 140 having a predetermined IP address and a predetermined MAC domain name server (DNS) address (S1306).

When the connection is completed, a video acquired by the built-in camera 235 is transmitted to the smartphone 140 and is transmitted to the smart TV 110 through the USB port (S1308 and S1310).

When the controller 214 receives a response signal from the smartphone 140 with respect to the video call request signal, the controller 214 performs video and voice call protocols to allow a video call to be performed and configures a communication environment in which the video call may be performed between the smart TV 110 and the smartphone 140.

Then, the controller 214 transmits the video captured by the built-in camera 235 to the smartphone 140, receives a video data signal and an audio data signal from the smartphone 140 through the router 120, transmits the video data signal and the audio data signal to the smart TV 110, and performs a two-way video call between the built-in camera 235, the smart TV 110, and the smartphone 140.

In this case, during the video call, the controller 214 detects whether the smart TV 100 is turned on in preparation for a situation in which the smart TV 110 is turned off.

Since the TV control device 200 employs a separate power source 238 and the smart TV 110 and TV control device 200 are connected to each other through a USB, a power output state and a signal state of the USB in the smart TV 110 are detected to determine whether the smart TV 110 is turned off or on, and an IR signal suitable for the smart TV 110 is output through the IR signal output part 240 so that the smart TV 110 may be turned on or off.

When it is determined that the smart TV 110 is turned off, the controller 214 generates a TV power ON signal and transmits the TV power ON signal to the smart TV 110. Here, the TV power ON signal is a signal for generating driving power for driving a TV screen in a TV power source of the smart TV 110 to turn the TV screen on.

FIG. 14 is a diagram illustrating an example of performing a crime prevention function using the TV control system according to the present invention.

Referring to FIG. 14, when a crime prevention mode setting signal is received, the controller 214 drives the human body detection sensor 232 to emit IR light to a subject and receives the IR light reflected from the subject to detect movement of the subject.

When a sensor output value, which is generated due to the movement detected from the human body detection sensor 232, is received, the controller 214 generates a control signal for automatically capturing the subject and transmits the control signal to the built-in camera 235. In this case, the controller 214 drives the built-in microphone 234 to acquire and collect surrounding audio information.

The controller 214 transmits the video information captured by the built-in camera 235 and the audio information collected through the built-in microphone 234 to the smartphone 140 through the router 120.

That is, the video information and the audio information are transmitted along a path of the controller 214→the wireless communication part 237→the router 120→the communication network 130→the smartphone 140.

When an alarm button provided on one side of the smartphone 140 is selected, the smartphone 140 generates an alarm button selection signal and transmits the alarm button selection signal to the controller 214 through the router 120. When the controller 214 receives the alarm button selection signal, the controller 214 outputs predetermined alarm audio information through a speaker. Here, the alarm audio information may include a siren sound, a sound for telling someone to leave the house, or a combination thereof.

Meanwhile, when the controller 214 receives a sensor output value indicating that there is no movement detected by the human body detection sensor 232 for a predetermined time, the controller 214 generates a capturing interruption signal and transmits the capturing interruption signal to the built-in camera 235.

In addition, when the controller 214 receives the sensor output value indicating that there is no movement detected by the human body detection sensor 232 for a predetermined time, the controller 214 generates the capturing interruption signal and transmits the capturing interruption signal to the built-in camera 235.

In addition, when the crime prevention mode setting signal is received, the controller 214 receives an illumination level detection value obtained by measuring an intensity of ambient light from the illumination level sensor 231, and when it is determined that the received illumination level detection value is less than or equal to a predetermined reference value (in a condition in which a illumination level is low or at night time), the controller 214 drives the IR LED 233 and executes a crime prevention mode responding to a low illumination level or even at night time.

FIG. 15 is a diagram illustrating an example of performing companion animal care using the TV control system according to the present invention.

Referring to FIG. 15, when a setting signal of a companion animal care mode is received, the controller 214 detects an ambient noise through the built-in microphone 234, and when a specific sound wave of a pet dog continues over a certain level, the controller 214 controls to generate a TV power ON signal for turning the TV screen on, transmit the TV power ON signal to the smart TV 110, transmit video and audio signals from the built-in camera 235 and the built-in microphone 234 to the smartphone 140, and transmit video and audio signals of the smartphone 140 to the smart TV 110.

Although the description has been made with reference to the embodiments of the present invention, it should be understood that various alternations and modifications of the present invention can be devised by those skilled in the art to which the present invention pertains without departing from the spirit and scope of the present invention, which are defined by the appended claims.

The invention claimed is:

1. A television (TV) control system for viewing limitation and screen brightness control of a smart TV, the TV control system comprising:
    a TV control device configured to generate a viewing distance detection value and an illumination level detection value, input a setting value transmitted from a smartphone, and transmit a human body distance detection value, the illumination level detection value, the setting value, and a control signal to a smart TV;
    the smart TV configured to receive the viewing distance detection value, the illumination level detection value, and the setting value which are transmitted from the TV control device, perform screen blocking and screen brightness adjustment, and change a distance and time setting value in response to the control signal;
    a smartphone configured to generate and transmit a control signal for changing distance information and a control signal for changing time setting to the TV control device; and
    a router connected to the smartphone and the TV control device through a communication network and configured to relay the setting value and the control signal transmitted from the smartphone to the TV control device,
    wherein the TV control device includes:
    a universal serial bus (USB) port connected to the smart TV and configured to transmit and receive the viewing distance detection value, the illumination level detection value, and the control signal to and from the smart TV;
    a human body detection sensor configured to emit infrared (IR) light to a subject, receive the IR light reflected from the subject, generate the viewing distance detection value according to a distance from the subject, and transmit the viewing distance detection value to a controller;
    an illumination level sensor configured to measure an intensity of ambient light, generate the illumination level detection value, and transmit the illumination level detection value to the controller;
    a built-in microphone configured to collect a surrounding audio signal and transmit the surrounding audio signal to the controller;
    a built-in speaker configured to output a warning audio signal;
    a built-in camera configured to capture a surrounding video and transmit the captured surrounding video to the controller;
    an IR signal output part configured to output an IR signal for controlling the smart TV;
    a controller configured to transmit the viewing distance detection value, the illumination level detection value, and the control signal transmitted from the smartphone to the smart TV; and
    a wireless communication part configured to communicate with an external router in a wireless manner,
    an application configured to perform viewing distance limitation, screen brightness control, and changing of the distance and time setting values is installed in the smart TV,
    the TV control device transmits the illumination level detection value detected by the illumination level sensor and the viewing distance detection value detected by the human body detection sensor to the smart TV through the USB port, and the application installed in the smart TV controls or blocks an illumination level of a video signal being displayed according to the illumination level detection value and the viewing distance detection value which are transmitted from the controller,
    the TV control device transmits the viewing distance detection value generated from the human body detection sensor to the smartphone through the wireless communication part and the router, and when it is determined that the viewing distance detection value is within a predetermined distance, the smartphone generates a control signal for blocking the video signal and transmits the control signal to the TV control device, and in response to the control signal for blocking the video signal transmitted from the smartphone, the TV control device generates a signal for blocking a video output of the smart TV.

2. The TV control system of claim 1, wherein the smart TV compares a predetermined distance limitation setting value with the viewing distance detection value received from the TV control device and determines whether to perform screen blocking, and when the screen blocking is required, the smart TV performs the screen blocking.

3. The TV control system of claim 1, wherein:
the TV control device counts viewing time in addition to the detection of a viewing distance and transmits the counted viewing time to the smart TV; and
when it is determined that the counted viewing time is greater than or equal to a predetermined time, the smart TV blocks an output of the video signal.

4. The TV control system of claim 1, wherein the smart TV adjusts an R channel signal, a G channel signal, and a B channel signal on the basis of the received illumination level detection value to control brightness of a TV screen according to an external illumination level.

5. The TV control system of claim 1, wherein the smart TV controls blue light by adjusting an adjustment ratio of the B channel signal according to a predetermined blue light adjustment ratio.

6. The TV control system of claim 1, wherein the TV control device includes:
a USB port connected to the smart TV and configured to transmit and receive the viewing distance detection value, the illumination level detection value, and the control signal to and from the smart TV;
a human body detection sensor configured to emit infrared (IR) light to a subject, receive the IR light reflected from the subject, generate the viewing distance detection value according to a distance from the subject, and transmit the viewing distance detection value to a controller;
an illumination level sensor configured to measure an intensity of ambient light, generate the illumination level detection value, and transmit the illumination level detection value to the controller;
a built-in microphone configured to collect a surrounding audio signal and transmit the surrounding audio signal to the controller;
a built-in speaker configured to output a warning audio signal;
a built-in camera configured to capture a surrounding video and transmit the captured surrounding video to the controller;
an IR signal output part configured to output an IR signal for controlling the smart TV; and
a controller configured to transmit the viewing distance detection value, the illumination level detection value, and the control signal transmitted from the smartphone to the smart TV.

7. The TV control system of claim 1, wherein:
when it is determined that the viewing distance detection value is within predetermined distance information, the smartphone generates warning audio information and transmits the warning audio information to the TV control device; and
the TV control device outputs the warning audio information through the built-in speaker.

8. The TV control system of claim 1, wherein:
the controller counts the viewing time from the moment a viewer is detected by the human body detection sensor and transmits the counted viewing time to the smartphone through the wireless communication part and the router;
when it is determined that the counted viewing time is greater than or equal to a predetermined time, the smartphone generates a control signal for blocking the video signal and transmits the control signal to the TV control device; and
in response to the control signal for blocking the video signal, the TV control device generates a signal for blocking a video output of the smart TV.

9. The TV control system of claim 8, wherein:
when it is determined that the counted viewing time is greater than or equal to predetermined time information, the smartphone generates warning audio information and transmits the warning audio information to the TV control device; and
the TV control device outputs the warning audio information through the built-in speaker.

10. The TV control system of claim 1, wherein:
the smartphone generates a control signal for changing predetermined distance information and transmits the control signal to the TV control device;
the controller transmits a control signal for changing distance information to the smart TV; and
in response to the control signal for changing distance information, the smart TV changes the distance information.

11. The TV control system of claim 1, wherein:
the smartphone generates a control signal for changing predetermined time information and transmits the control signal to the TV control device;
the controller transmits a control signal for changing time information to the smart TV; and
in response to the control signal for changing time information, the smart TV changes the distance information and the time information.

12. The TV control system of claim 1, wherein:
the controller includes a mom call button configured to request a video call; and
when a call button on signal for performing a video call is received from the mom call button or an external smart button and smart band, the TV control device generates a video call request signal for requesting a video call and transmits the video call request signal to the smartphone having a registered phone number through the router.

13. The TV control system of claim 1, wherein:
when a crime prevention mode setting signal is received from the smartphone, the controller drives the human body detection sensor to emit IR light to the subject and receives the IR light reflected from the subject to detect movement of the subject;
when a sensor output value generated due to the movement detected from the human body detection sensor is received, the controller generates a control signal for automatically capturing the subject and transmits the control signal to the built-in camera and drives the built-in microphone to acquire and collect surrounding audio information; and
the controller transmits the video information captured by the built-in camera and the audio information collected through the built-in microphone to the smartphone through the wireless communication part and the router.

14. The TV control system of claim 13, wherein:
when an alarm button provided on one side of the smartphone is selected, the smartphone generates an alarm button selection signal and transmits the alarm button selection signal to the controller through the router; and
in response to the alarm button selection signal, the controller outputs predetermined alarm audio information through the built-in speaker.

15. The TV control system of claim 14, wherein, when the controller receives a sensor output value indicating that there is no movement detected from the human body detection sensor for a predetermined time, the controller generates a capturing interruption signal and transmits the capturing interruption signal to the built-in camera.

16. The TV control system of claim 15, wherein:
the controller further includes an IR light-emitting diode (LED); and
when a setting signal of a crime prevention mode is received, the controller receives an illumination level detection value obtained by measuring an intensity of ambient light from the illumination level sensor, and when it is determined that the received illumination level detection value is less than or equal to a predetermined reference value, the controller drives the IR LED and executes the crime prevention mode responding to a low illumination level or even at night time.

17. The TV control system of claim 1, wherein, when a setting signal of a companion animal care mode is received, the controller detects an ambient noise through the built-in microphone, and when a specific sound wave of a pet dog over a certain level continues, the controller generates a TV power ON signal for turning power of the smart TV on, transmits the TV power ON signal to the smart TV, transmits the video signal and the audio signal of the built-in camera and the built-in microphone to the smartphone, and transmits video and audio signals of the smartphone to the smart TV.

18. The TV control system of claim 1, wherein, when the controller receives a response signal from the smartphone with respect to the video call request signal, the controller performs video and audio call protocols to allow the video call to be performed, configures a communication environment in which the video call is capable of being performed between the smart TV and the smartphone, transmits the video captured by the built-in camera to the smartphone, receives a video data signal and an audio data signal of the smartphone through the router, outputs the video data signal and the audio data signal to the smart TV, and performs the video call between the built-in camera, the smart TV, and the smartphone.

* * * * *